(12) United States Patent
Xie

(10) Patent No.: US 11,536,032 B2
(45) Date of Patent: Dec. 27, 2022

(54) TILE REPLACEMENT FLASHING FOR USE WITH A TILE HOOK

(71) Applicant: Jason Sen Xie, Fremont, CA (US)

(72) Inventor: Jason Sen Xie, Fremont, CA (US)

( * ) Notice: Subject to any disclaimer, the term of this patent is extended or adjusted under 35 U.S.C. 154(b) by 386 days.

(21) Appl. No.: 16/804,150

(22) Filed: Feb. 28, 2020

(65) Prior Publication Data

US 2020/0399902 A1    Dec. 24, 2020

Related U.S. Application Data

(60) Provisional application No. 62/865,123, filed on Jun. 21, 2019.

(51) Int. Cl.
*E04D 1/30* (2006.01)
*E04D 1/06* (2006.01)
(Continued)

(52) U.S. Cl.
CPC .............. *E04D 1/30* (2013.01); *E04D 1/06* (2013.01); *E04D 1/18* (2013.01); *E04D 1/2918* (2019.08);
(Continued)

(58) Field of Classification Search
CPC .... E04D 1/30; E04D 1/06; E04D 1/18; E04D 1/2918; E04D 1/2935; E04D 2001/308;
(Continued)

(56) References Cited

U.S. PATENT DOCUMENTS 1,619,600 A * 3/1927 Cumfer ................ E04D 1/26
52/529
2,060,618 A * 11/1936 Honigbaum .......... E04D 1/2918
52/526

(Continued)

OTHER PUBLICATIONS

IronRidge Knockout Tile, KOB-01-Man Rev. 1.30, Available from IronRidge, Inc., www.ironridge.com, 2019.
(Continued)

*Primary Examiner* — Phi D A
(74) *Attorney, Agent, or Firm* — Douglas L. Weller

(57) ABSTRACT

A tile replacement flashing is used with a tile hook. A bottom tile replacement flashing is shaped for placement on a lower portion of a location where a tile is removed from a roof. A top tile replacement flashing is shaped for placement on an upper portion of a location where the tile is removed from the roof. The top tile replacement flashing includes an elevated region at a lower portion of the top tile replacement flashing, the elevated region. The bottom tile replacement flashing is shaped so that after attachment of the bottom tile replacement flashing on the roof, the tile hook can be attached to a rafter of the roof, the attached tile hook extending over an upper portion of the bottom tile replacement flashing and having a portion that, past the upper portion of the bottom tile replacement flashing, extends upwards. The top tile replacement flashing is shaped so that after attachment of the top tile replacement flashing on the roof, at least part of the elevated region of the top tile replacement flashing extends over the bottom tile replacement flashing. A height of the elevated region is sufficient to allow room for the tile hook to extend over the bottom tile replacement flashing and under the elevated region of top tile replacement flashing.

20 Claims, 9 Drawing Sheets

(51) Int. Cl.
*E04D 1/18* (2006.01)
*F24S 20/67* (2018.01)
*F24S 25/60* (2018.01)
*E04D 1/00* (2006.01)
*H02S 20/23* (2014.01)

(52) U.S. Cl.
CPC ............ *E04D 1/2935* (2019.08); *F24S 20/67* (2018.05); *F24S 25/60* (2018.05); *F24S 2025/6002* (2018.05); *H02S 20/23* (2014.12)

(58) Field of Classification Search
CPC .... F24S 20/67; F24S 25/60; F24S 2025/6002; F24S 25/613; F24S 2025/021; H02S 20/23; Y02B 10/10; Y02B 10/20; Y02E 10/47; Y02E 10/50
See application file for complete search history.

(56) References Cited

U.S. PATENT DOCUMENTS

| | | | | |
|---|---|---|---|---|
| 2,993,307 | A * | 7/1961 | Wendt | E04D 1/2918 52/525 |
| 3,045,395 | A * | 7/1962 | Fasold | E04D 1/26 52/527 |
| 5,990,414 | A * | 11/1999 | Posnansky | H02S 20/23 52/173.3 |
| 2011/0094568 | A1 * | 4/2011 | Keenihan | F24S 25/40 136/251 |

OTHER PUBLICATIONS

QuickMount PV, downloaded from internet website https://www.quickmountpv.com/products/tile-replacement-flashings.html?cur=1; Downloaded Feb. 24, 2020.

* cited by examiner

TILE REPLACEMENT FLASHING FOR USE WITH A TILE HOOK

BACKGROUND

For solar photovoltaic and other application installations on tile roofs, the most common roof attachments used to secure solar a mounting system to the roof are tile hooks with or without tile replacement flashing. Tile replacement flashing is usually a piece of aluminum fabricated in the shape of a tile. The tile hook is usually a one-piece or a two-piece metal bracket, of which the lower part is secured to a rafter on the tile roof and the top part is connected with a rail for a solar mounting system or other applications. The tile replacement flashing may be used to replace the tile so that the tile hook can fit better with surrounding tiles. The tile hook may come through the lower edge of the tile replacement flashing or come through a pre-drilled hole in the center of the tile replacement flashing.

Due to various shapes of flat tile, S-tile, W-tile and other shaped tiles, a tile hook is usually installed at the lowest location of the tile curve that is the valley of a tile. However, a tile hook needs to be secured to a rafter and the rafter can be a few inches away from the valley of a tile. Therefore, an extension base that is usually a metal plate has to be used and secured to the rafter and connected with a tile hook arm. Such a structure may not withstand high uplift or compression force due to longer offset from lag screws securing the tile hook to the rafter and load position of the solar mounting system.

Most tile hooks are made with stainless steel and deflect under force. A tile hook may deflect and make contact with tile underneath under compression force. Such defection may cause an underneath tile to crack. In addition, installers must also trim the weather guard lug on a tile to ensure the tile sits back down in its proper original position.

There are some tile replacements available, but they still have the same issues, the location of the pre-drilled hole for a roof attachment may not be at the location where the rafter is. An extension plate must be used and again causes roof attachment not able to withstand high uplift and compression force. There are also some tile replacement tiles that are similar to regular tiles without a pre-drilled hole. They are used to install tile hooks without trimming the weather guard lug on the replaced tiles.

Tile can be installed with batten or without batten and tiles have different tile shape and thickness, which make tile hook installation difficult. A tile hook must have a large range of height adjustment in order to fit different tiles. This may require many varieties of tile hooks to fit tiles with different height and shape. Manufacturers have to produce many different tile hooks and installers have to stock many different tile hooks.

DETAILED DESCRIPTION

Disclosed below is a height-adjustable tile hook with a tile replacement flashing that fits most common tile roofs. The tile replacement flashings have three profiles that fit flat tile, S-tile and W-tile. Additional tile replacement flashings can be used that fit tile with any different tile profile.

A universal height-adjustable tile hook and a tile replacement flashing are disclosed. The tile replacement flashing is designed in two parts. The three components of such a system, therefore, include a top tile replacement flashing, a height-adjustable tile hook and a bottom tile replacement flashing. The top tile replacement flashing and the bottom tile replacement flashing are installed and secured together to substitute for a regular tile. The bottom tile replacement flashing is installed first. The height-adjustable tile hook is then installed and secured to a rafter on a tile roof aligned with the upper edge of the bottom tile replacement flashing. The top tile replacement flashing is installed above tile hook and overlaps with the bottom tile replacement flashing. The top tile replacement flashing is secured together with the bottom tile replacement flashing through locking pins. The installed top and bottom tile replacement flashings function as one regular tile. The tile hook comes through a notch at the overlapping area of the installed top and bottom tile replacement flashings.

Figure 1:
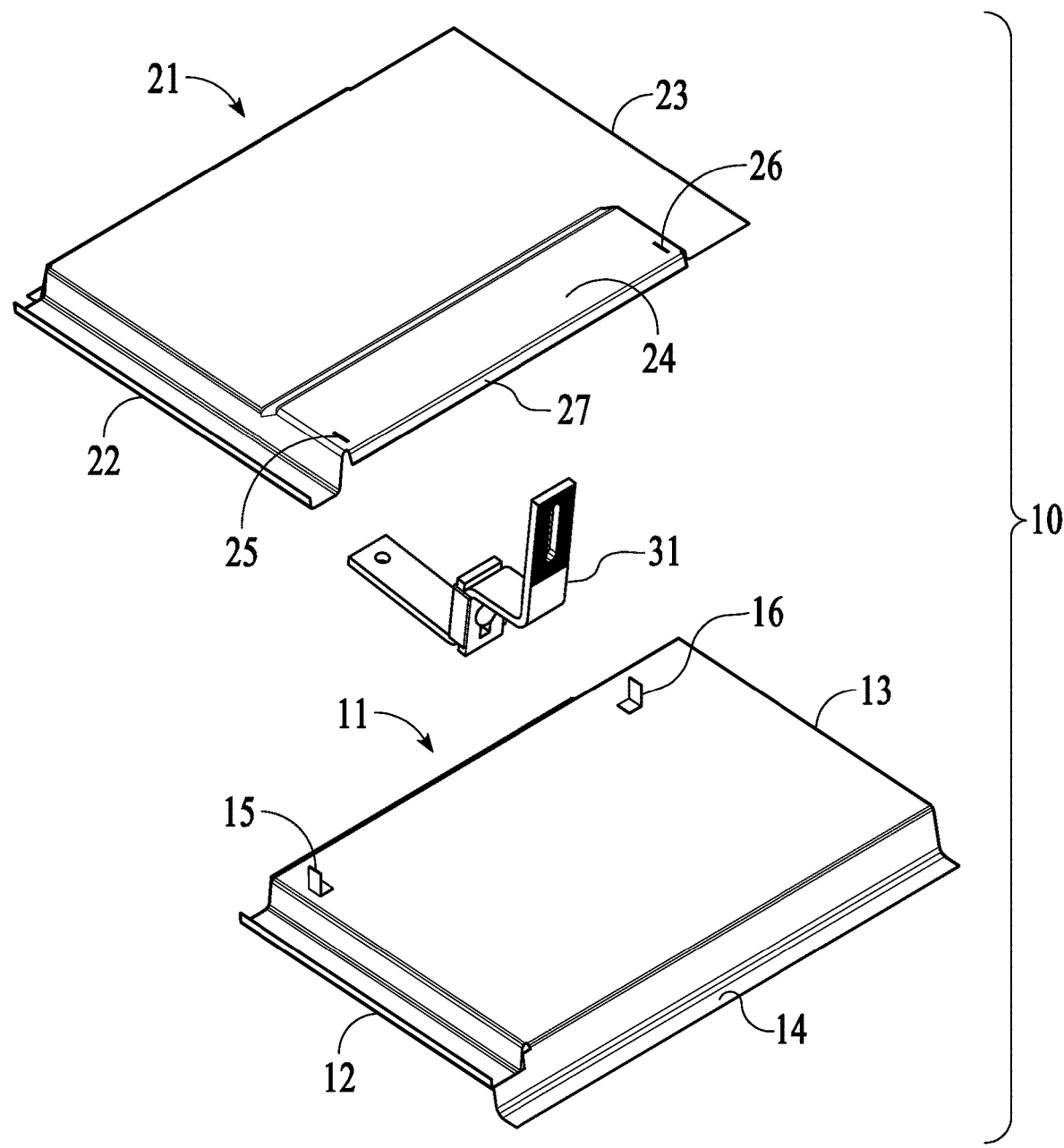
FIG. 1 is a perspective view of a tile hook and flat tile replacement flashing system 10 before assembly.
Figure 2:
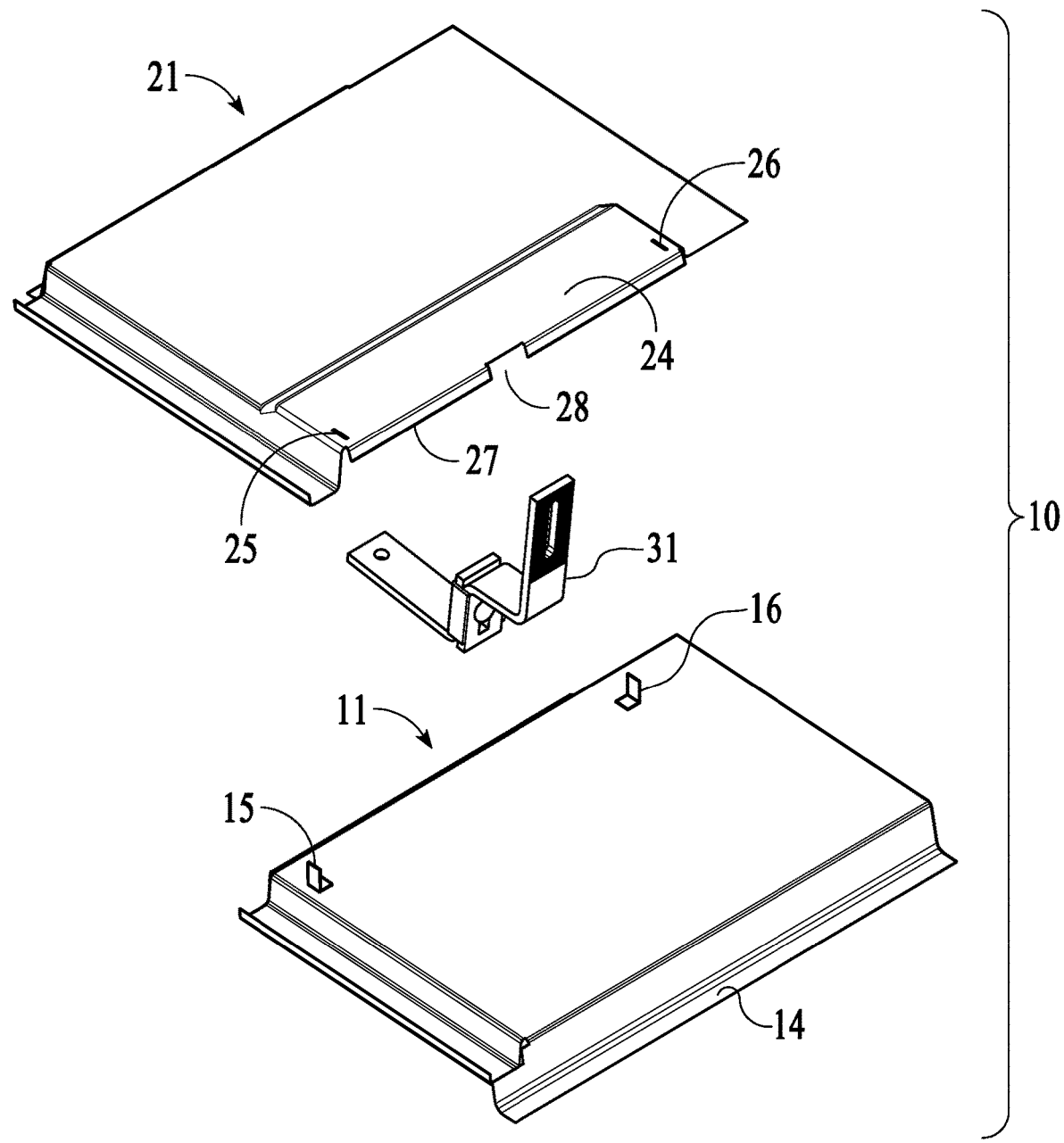
FIG. 2 is a perspective view of a tile hook and flat tile replacement flashing system 10 with a notch at a lower edge of a top tile replacement flashing for a tile hook arm, before assembly.
Figure 3:
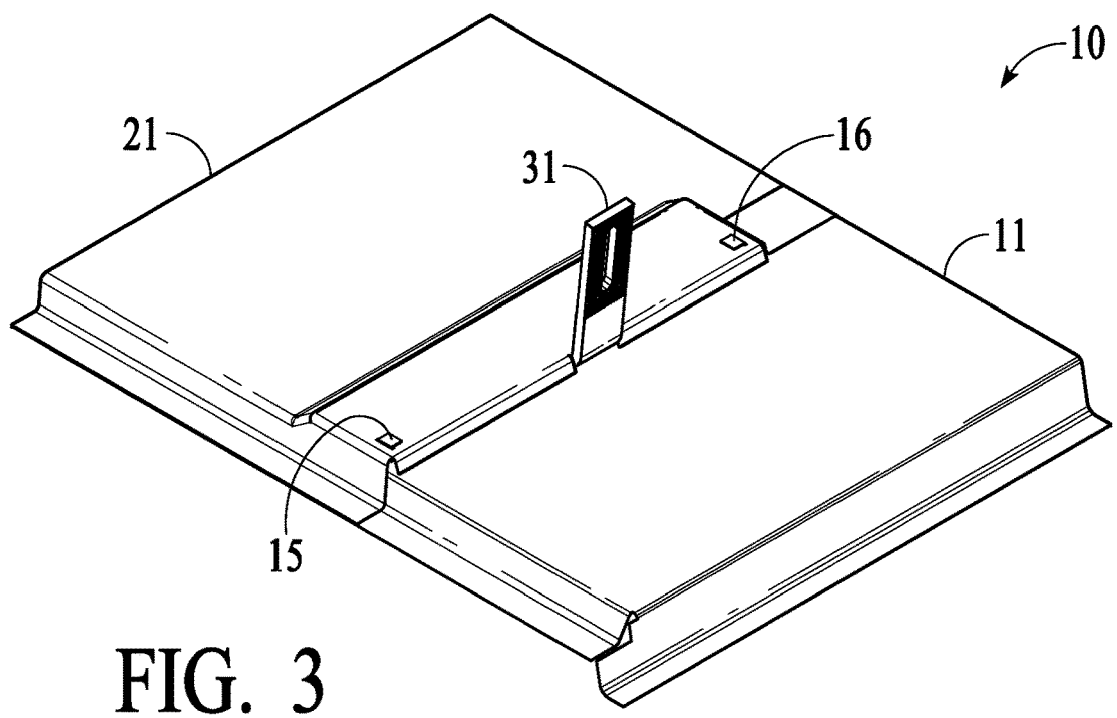
FIG. 3 is a perspective view of a tile hook and flat tile replacement flashing system 10 after assembly.

FIG. 1, FIG. 2 and FIG. 3 show a tile hook and flat tile replacement flashing system 10. For example, tile hook and flat tile replacement flashing system 10 has a height-adjustable tile hook 31 and a tile replacement flashing having two parts: a top tile replacement flashing 21 and a bottom tile replacement flashing 11. Top tile replacement flashing 21 and bottom tile replacement flashing 11 are installed and secured together to replace a regular tile.

To install, the installer removes the original tile where tile hook 31 is to be installed. Bottom tile replacement flashing 11 is installed first. After bottom tile replacement flashing 11 is installed, tile hook 31 is installed above where a rafter is located. Tile hook 31 is aligned with the upper edge of bottom tile replacement flashing 11. After tile hook 31 is installed, top tile replacement flashing 21 is installed above tile hook 31 and overlaps with bottom tile replacement flashing 11. A notch 28 is cut on a lower edge 27 of top tile replacement flashing 21 so lower edge 27 of top tile replacement flashing 21 can fit over tile hook 31 snugly. Notch 28 can be cut anywhere in lower edge 27. This accommodates the location of the intersection of the rafter and tile replacement flashing anywhere along lower edge 27.

An elevated region 24 provides room for tile hook 31 to fit under top tile replacement flashing 21. A locking slot 25 and a locking slot 26 in top tile replacement flashing 21 aligned with a locking pin 15 and a locking pin 16 on bottom tile replacement flashing 21 are used to precisely align connection of top tile replacement flashing 21 and bottom tile replacement flashing 11. Lower edge 27 of top tile replacement flashing 21 overlaps the upper edge of bottom tile replacement flashing 11 and locking pin 15 and locking pin 16 pass through locking slot 25 and locking slot 26. As shown in FIG. 3, locking pin 15 and locking pin 16 are pressed down so top tile replacement flashing 21 and bottom tile replacement flashing 11 are secured together through locking pin 15 and locking pin 16. The installed top and bottom tile replacement flashings are just like one regular tile and tile hook 31 comes through notch 28 at the overlapping area of them.

Figure 4:
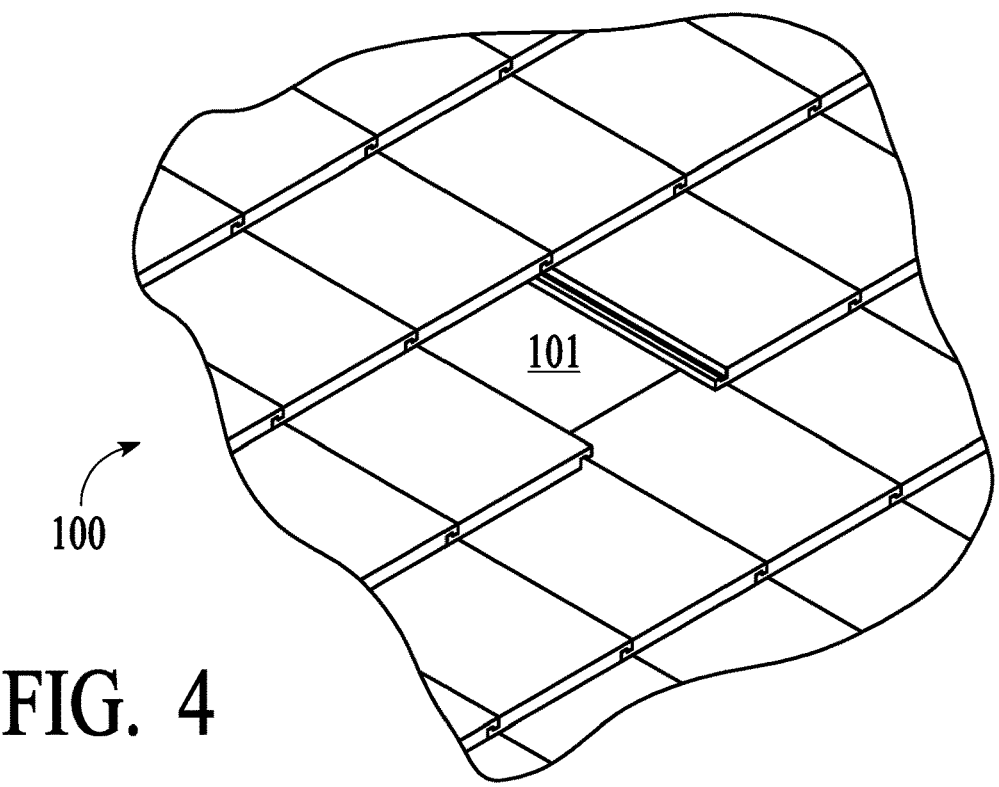
FIG. 4 is a perspective view of a flat roof with a flat tile removed in the center.

FIG. 4, FIG. 5, FIG. 6, FIG. 7 and FIG. 8 show a tile hook and flat tile replacement flashing system 10 being placed on a flat tile roof. For example, FIG. 4 shows a flat tile roof 100 with one original flat tile removed at a location 101, where height-adjustable tile hook 31 and the tile replacement flashing of flat tile replacement flashing system 10 will be installed.

Figure 5:
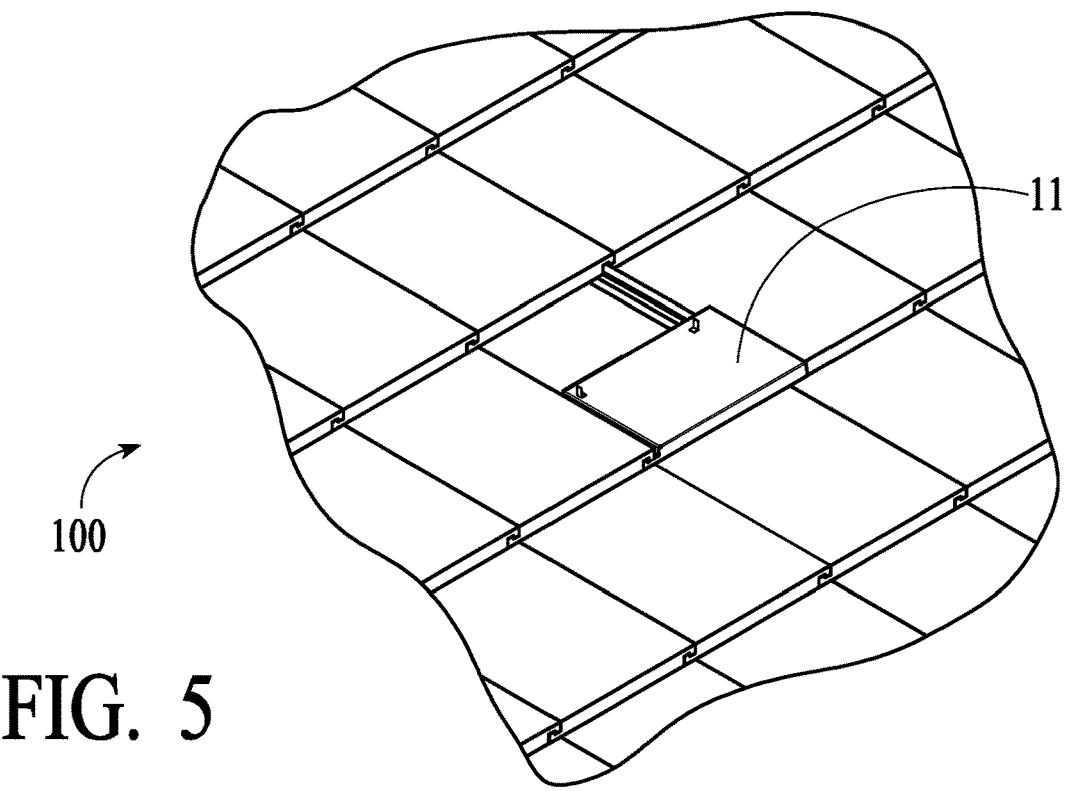
FIG. 5 is a perspective view of a flat roof with a bottom tile replacement flashing installed.
Figure 6:
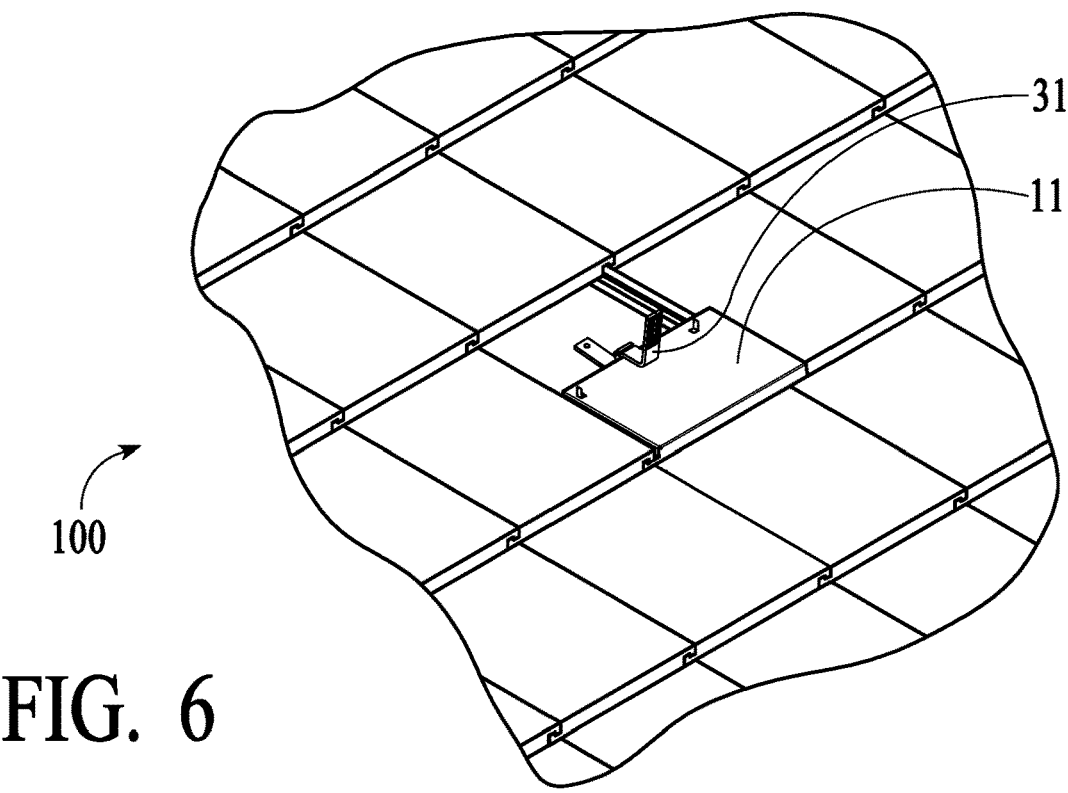
FIG. 6 is a perspective view of a flat roof with a bottom tile replacement flashing and a height-adjustable tile hook installed.

FIG. 5 shows bottom tile replacement flashing 11 being installed first. FIG. 6 shows the height-adjustable tile hook 31 is installed and secured above where a rafter is on tile roof 100 and aligned with the upper edge of bottom tile replacement flashing 11.

Figure 7:
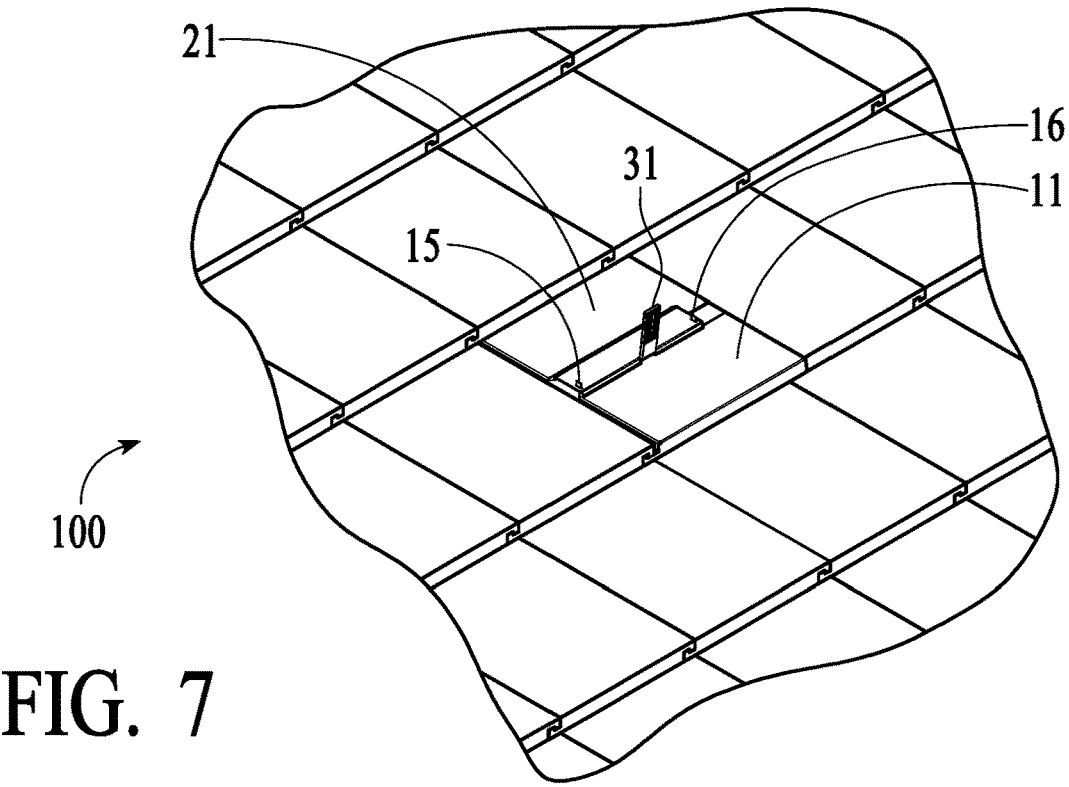
FIG. 7 is a perspective view of a flat roof with a bottom tile replacement flashing, height-adjustable tile hook and top tile replacement flashing installed.

FIG. 7 shows top tile replacement flashing 21 is installed above tile hook 31 and overlaps with bottom tile replacement flashing 11. Depending on tile hook 31 location, notch 28 is cut on lower edge 27 of top tile replacement flashing 21 so lower edge 27 of top tile replacement flashing 21 can fit over tile hook 31 snugly. Locking pin 15 and locking pin 16 on bottom tile replacement flashing 11 pass through locking slot 25 and locking slot 26 on top tile replacement flashing 21.

Figure 8:
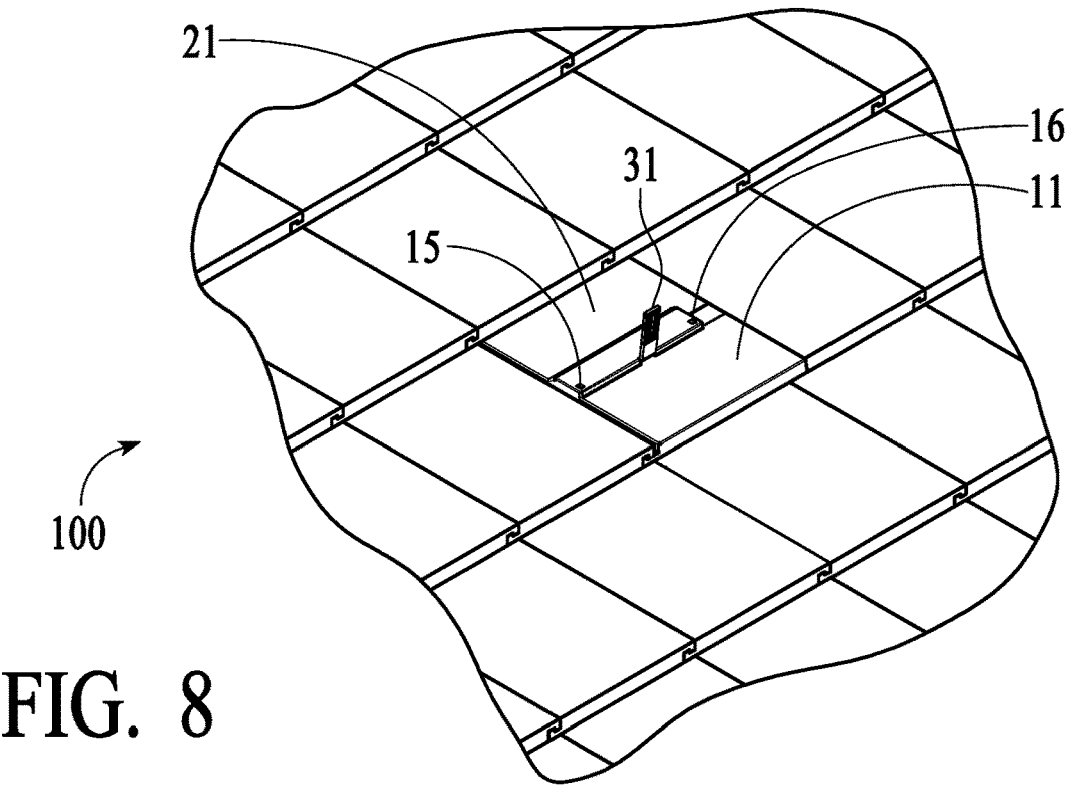
FIG. 8 is a perspective view of a flat roof with a bottom tile replacement flashing, height-adjustable tile hook and top tile replacement flashing installed and the locking pins pressed down.

FIG. 8 shows locking pin 15 and locking pin 16 on bottom tile replacement flashing 11 are pressed down, so top tile replacement flashing 21 is secured together with bottom tile replacement flashing 11 through locking pin 15 and locking pin 16. The installed top and bottom tile replacement flashings are just like one regular tile and tile hook 31 comes through notch 28 at the overlapping area of the installed top and bottom tile replacement flashings.

Figure 9:
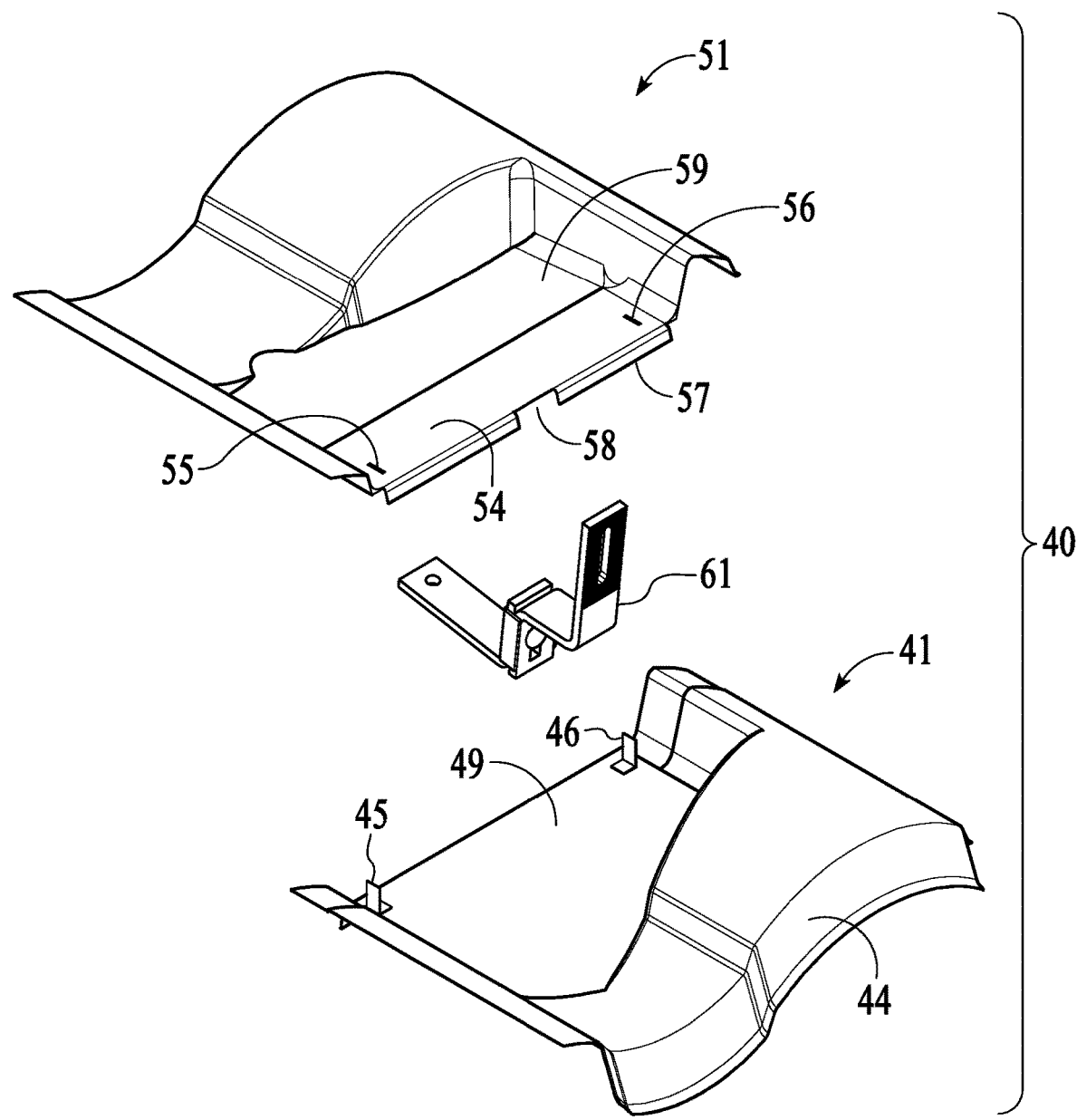
FIG. 9 is a perspective view of a tile hook with an S-tile replacement flashing before assembly.
Figure 10:
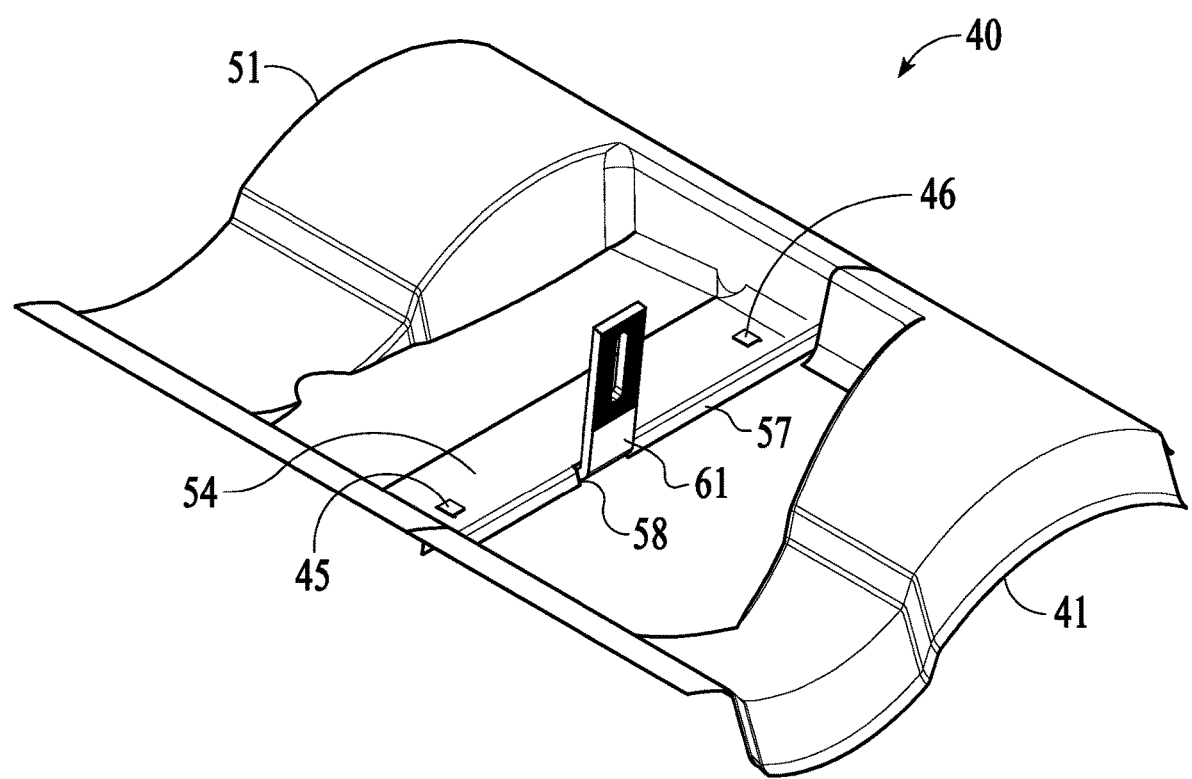
FIG. 10 is a perspective view of a tile hook with an S-tile replacement flashing after assembly.

FIG. 9 and FIG. 10 show an S-tile replacement flashing system 40 with a tile hook 61. For example, S-tile replacement flashing system 40 is similar to flat tile replacement flashing system 10. Due to the shape of the S-tile, a lower portion 59 of top tile replacement flashing 51 and an upper portion 49 of bottom tile replacement flashing 41 are fabricated in a flat shape so that tile hook 61 can be installed anywhere along an upper edge of bottom tile replacement flashing 41.

To install, the installer removes the original tile where tile hook 61 is to be installed. Bottom tile replacement flashing 41 is installed first. After bottom tile replacement flashing 41 is installed, tile hook 61 is installed above where a rafter is located. Tile hook 61 is aligned with the upper edge of bottom tile replacement flashing 41. After tile hook 61 is installed, top tile replacement flashing 51 is installed above tile hook 61 and overlaps with bottom tile replacement flashing 41. A notch 58 is cut on a lower edge 57 of top tile replacement flashing 51 so lower edge 57 of top tile replacement flashing 51 can fit over tile hook 61 snugly. Notch 58 can be cut anywhere in lower edge 57. This accommodates the location of the intersection of the rafter and tile replacement flashing anywhere along lower edge 57.

An elevated region 54 provides room for tile hook 61 to fit under tile replacement flashing 51. A locking slot 55 and a locking slot 56 in top tile replacement flashing 51 aligned with a locking pin 45 and a locking pin 46 on bottom tile replacement flashing 51 are used to precisely align connection of top tile replacement flashing 51 and bottom tile replacement flashing 41. Lower edge 57 of top tile replacement flashing 51 overlaps the upper edge of bottom tile replacement flashing 41 and locking pin 45 and locking pin 46 pass through locking slot 55 and locking slot 56. As shown in FIG. 10, locking pin 45 and locking pin 46 are pressed down so top tile replacement flashing 51 and bottom tile replacement flashing 41 are secured together through locking pin 45 and locking pin 46. The installed top and bottom tile replacement flashings are just like one regular tile and tile hook 61 comes through notch 58 at the overlapping area of top tile replacement flashing 51 and bottom tile replacement flashing 41.

Figure 11:
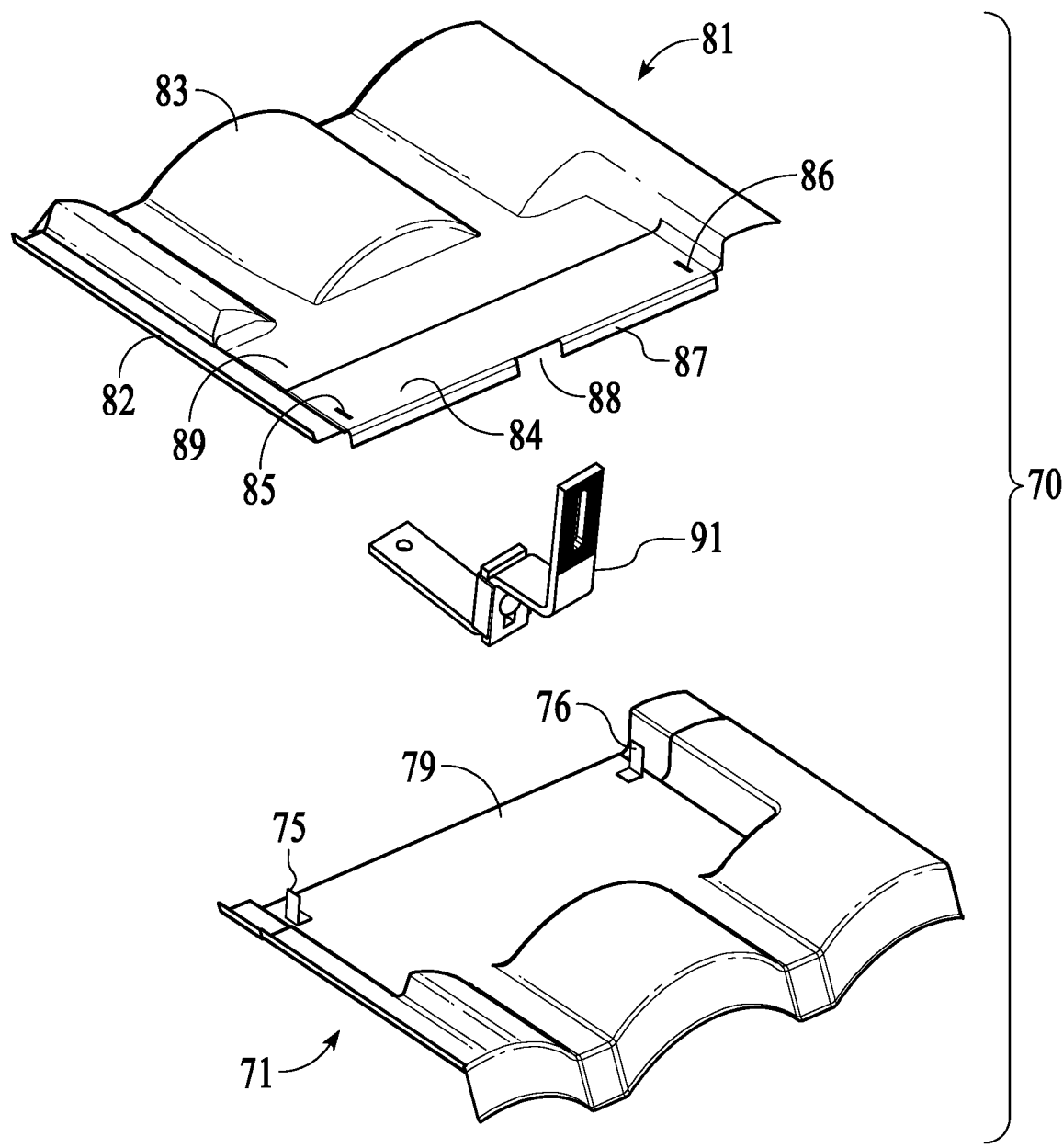
FIG. 11 is a perspective view of a tile hook with a W-tile replacement flashing before assembly.
Figure 12:
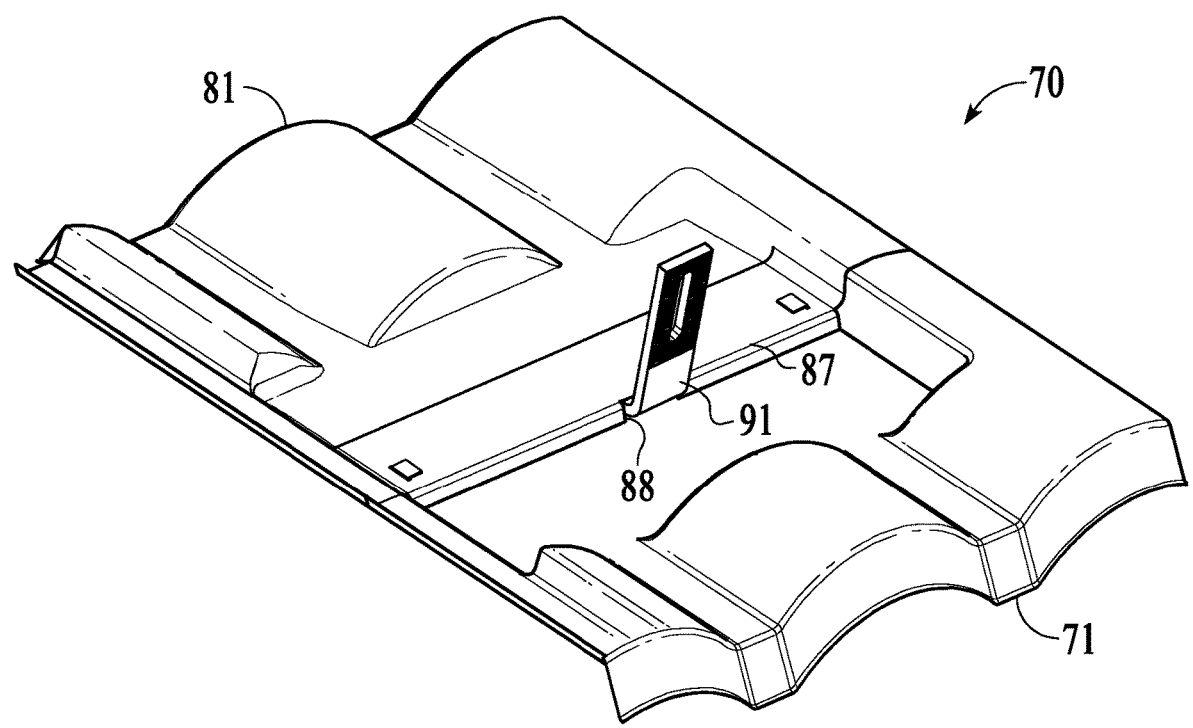
FIG. 12 is a perspective view of a tile hook with a W-tile replacement flashing after assembly.

FIG. 11 and FIG. 12 show a W-tile replacement flashing system 70 with a tile hook 91. For example, W-tile replacement flashing system 70 is similar to S-tile replacement flashing system 40. Due to the shape of the W-tile, a lower portion 89 of top tile replacement flashing 81 and an upper portion 79 of bottom tile replacement flashing 71 are fabricated in a flat shape so that tile hook 91 can be installed anywhere along an upper edge of bottom tile replacement flashing 71.

To install, the installer removes the original tile where tile hook 91 is to be installed. Bottom tile replacement flashing 71 is installed first. After bottom tile replacement flashing 71 is installed, tile hook 91 is installed above where a rafter is located. Tile hook 91 is aligned with the upper edge of bottom tile replacement flashing 71. After tile hook 91 is installed, top tile replacement flashing 81 is installed above tile hook 91 and overlaps with bottom tile replacement flashing 71. A notch 88 is cut on a lower edge 87 of top tile replacement flashing 81 so lower edge 87 of top tile replacement flashing 81 can fit over tile hook 91 snugly. Notch 88 can be cut anywhere in lower edge 87. This accommodates the location of the intersection of the rafter and tile replacement flashing anywhere along lower edge 87.

An elevated region 84 provides room for tile hook 91 to fit under tile replacement flashing 81. A locking slot 85 and a locking slot 86 in top tile replacement flashing 81 aligned with a locking pin 75 and a locking pin 76 on bottom tile replacement flashing 81 are used to precisely align connection of top tile replacement flashing 81 and bottom tile replacement flashing 71. Lower edge 87 of top tile replacement flashing 81 overlaps the upper edge of bottom tile replacement flashing 71 and locking pin 75 and locking pin 76 pass through locking slot 85 and locking slot 86. As shown in FIG. 12, locking pin 75 and locking pin 76 are pressed down so top tile replacement flashing 81 and bottom tile replacement flashing 71 are secured together through locking pin 75 and locking pin 76. The installed top and bottom tile replacement flashings are just like one regular tile and tile hook 91 comes through notch 88 at the overlapping area of top tile replacement flashing 81 and bottom tile replacement flashing 71.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:
1. A tile hook replacement flashing system, comprising:
a tile hook;
a bottom tile replacement flashing; shaped for placement on a lower portion of a location where a tile is removed from a roof; and
a top tile replacement flashing, shaped for placement on an upper portion of a location where the tile is removed from the roof, the top tile replacement flashing including an elevated region at a lower portion of the top tile replacement flashing;
wherein the bottom tile replacement flashing is shaped so that after attachment of the bottom tile replacement flashing on the roof and before attachment of the top tile replacement flashing on the roof, the tile hook can be attached to a rafter of the roof, the attached tile hook extending over an upper portion of the bottom tile replacement flashing and having a portion that, past the upper portion of the bottom tile replacement flashing, extends upwards;
wherein the top tile replacement flashing is shaped so that after attachment of the top tile replacement flashing on the roof, at least part of the elevated region of the top tile replacement flashing extends over the bottom tile replacement flashing, a height of the elevated region being sufficient to allow room for the tile hook to extend over the bottom tile replacement flashing and under the elevated region of top tile replacement flashing; and
wherein neither the bottom tile replacement flashing alone nor the top tile replacement alone covers entirely the location where the tile is removed from the roof, so that both the bottom tile replacement flashing and the top tile replacement are attached to the roof to cover entirely the location where the tile is removed from the roof.

2. A tile hook replacement flashing system as in claim 1, wherein the elevated region of the top tile replacement flashing has a lower edge that extends down towards the roof, the lower edge having a notch sized and at a location to allow the tile hook to extend out from under the elevated region of the top tile replacement flashing before the attached tile hook extends upward.

3. A tile hook replacement flashing system as in claim 1, wherein the bottom tile replacement flashing and the top tile replacement flashing are shaped to replace a flat tile on a flat tile roof.

4. A tile hook replacement flashing system as in claim 1, wherein the bottom tile replacement flashing and the top tile replacement flashing are shaped to replace an S-tile on an S-tile roof.

5. A tile hook replacement flashing system as in claim 4, wherein an upper portion of the bottom tile replacement flashing and a lower portion of the top tile replacement flashing are fabricated in a flat shape.

6. A tile hook replacement flashing system as in claim 1, wherein the bottom tile replacement flashing and the top tile replacement flashing are shaped to replace a W-tile on a W-tile roof.

7. A tile hook replacement flashing system as in claim 6, wherein an upper portion of the bottom tile replacement flashing and a lower portion of the top tile replacement flashing are fabricated in a flat shape.

8. A tile hook replacement flashing system as in claim 1:
wherein the top tile replacement flashing includes two slots; and
wherein the bottom tile replacement flashing includes two tabs located on the bottom tile replacement to align with the two slots, so that when the top tile replacement flashing is placed on the roof, the two tabs extend through the two slots and are flattened down to secure the top tile replacement flashing to the bottom tile replacement flashing.

9. A tile replacement flashing for use with a tile hook, comprising:
a bottom tile replacement flashing; shaped for placement on a lower portion of a location where a tile is removed from a roof; and
a top tile replacement flashing, shaped for placement on an upper portion of a location where the tile is removed from the roof, the top tile replacement flashing including an elevated region at a lower portion of the top tile replacement flashing;
wherein the bottom tile replacement flashing is shaped so that after attachment of the bottom tile replacement flashing on the roof and before attachment of the top tile replacement flashing on the roof, the tile hook can be attached to a rafter of the roof, the attached tile hook extending over an upper portion of the bottom tile replacement flashing and having a portion that, past the upper portion of the bottom tile replacement flashing, extends upwards;
wherein the top tile replacement flashing is shaped so that after attachment of the top tile replacement flashing on the roof, at least part of the elevated region of the top tile replacement flashing extends over the bottom tile replacement flashing, a height of the elevated region being sufficient to allow room for the tile hook to extend over the bottom tile replacement flashing and under the elevated region of top tile replacement flashing; and
wherein neither the bottom tile replacement flashing alone nor the top tile replacement alone covers entirely the location where the tile is removed from the roof, so that both the bottom tile replacement flashing and the top tile replacement are attached to the roof to cover entirely the location where the tile is removed from the roof.

10. A tile replacement flashing as in claim 9, wherein the elevated region of the top tile replacement flashing has a lower edge that extends down towards the roof, the lower edge having a notch sized and at a location to allow the tile hook to extend out from under the elevated region of the top tile replacement flashing before the attached tile hook extends upward.

11. A tile replacement flashing as in claim 9, wherein the bottom tile replacement flashing and the top tile replacement flashing are shaped to replace a flat tile on a flat tile roof.

12. A tile replacement flashing as in claim 9, wherein the bottom tile replacement flashing and the top tile replacement flashing are shaped to replace an S-tile on an S-tile roof.

13. A tile replacement flashing as in claim 9, wherein the bottom tile replacement flashing and the top tile replacement flashing are shaped to replace a W-tile on a W-tile roof.

14. A tile replacement flashing as in claim 9:
wherein the top tile replacement flashing includes two slots; and wherein the bottom tile replacement flashing includes two tabs located on the bottom tile replacement to align with the two slots, so that when the top tile replacement flashing is placed on the roof, the two tabs extend through the two slots and are flattened down to secure the top tile replacement flashing to the bottom tile replacement flashing.

15. A method for placing a tile hook on a roof, the method comprising:

removing a tile from the roof;

placing a bottom tile replacement flashing on the roof on a lower portion of a location where the tile was removed from a roof;

attaching the tile hook to a rafter of the roof so that the attached tile hook extends over an upper portion of the bottom tile replacement flashing and, past the upper portion of the bottom tile replacement flashing, extends upwards; and placing a top tile replacement flashing on the roof so that after attachment of the top tile replacement flashing on the roof, at least part of an elevated region of the top tile replacement flashing extends over the bottom tile replacement flashing, a height of the elevated region being sufficient to allow room for the tile hook to extend over the bottom tile replacement flashing and under the elevated region of top tile replacement flashing.

16. A method as in claim 15:

wherein the elevated region of the top tile replacement flashing has a lower edge that extends down towards the roof; and wherein the method additional comprises:

placing a notch that is sized and at a location to allow the tile hook to extend out from under the elevated region of the top tile replacement flashing before the attached tile hook extends upward.

17. A method as in claim 15, wherein the bottom tile replacement flashing and the top tile replacement flashing are shaped to replace a flat tile on a flat tile roof.

18. A method as in claim 15, wherein the bottom tile replacement flashing and the top tile replacement flashing are shaped to replace an S-tile on an S-tile roof.

19. A method as in claim 15, wherein the bottom tile replacement flashing and the top tile replacement flashing are shaped to replace a W-tile on a W- tile roof.

20. A method as in claim 15:

wherein the top tile replacement flashing includes two slots;

wherein the bottom tile replacement flashing includes two tabs located on the bottom tile replacement to align with the two slots; and wherein when the top tile replacement flashing is placed on the roof, the two tabs extend through the two slots; and wherein the method additionally comprises:

flattening down the two tabs to secure the top tile replacement flashing to the bottom tile replacement flashing.

* * * * *